Patented July 7, 1925.

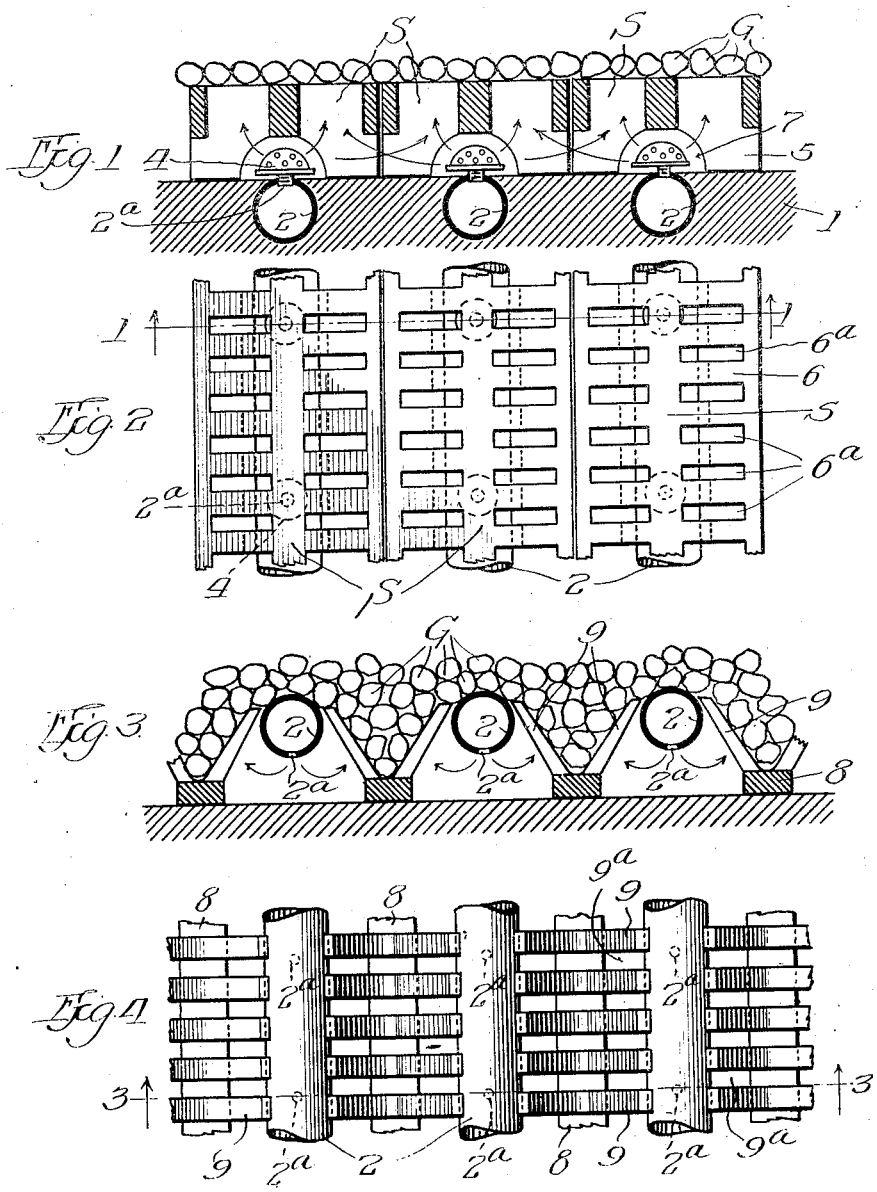

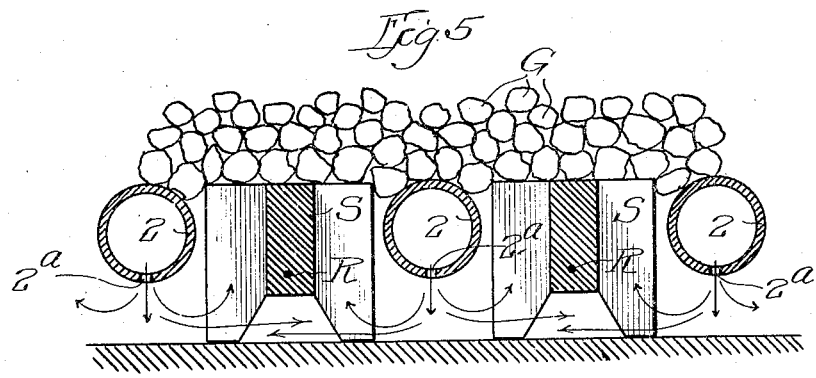
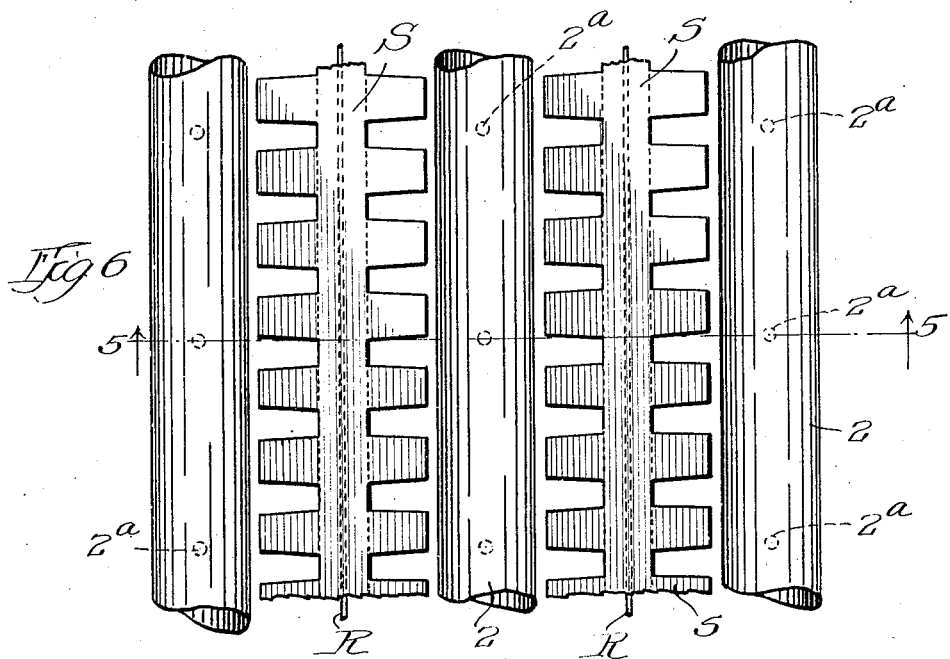

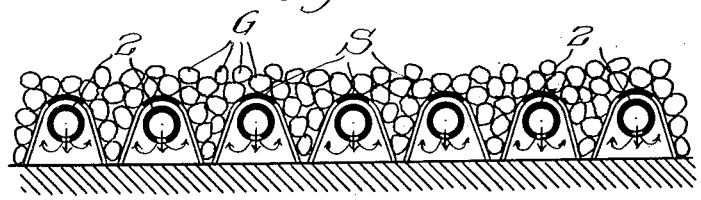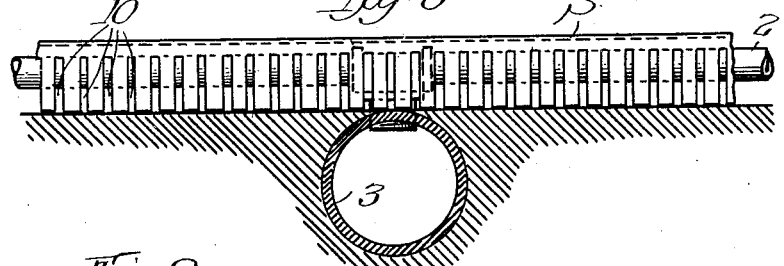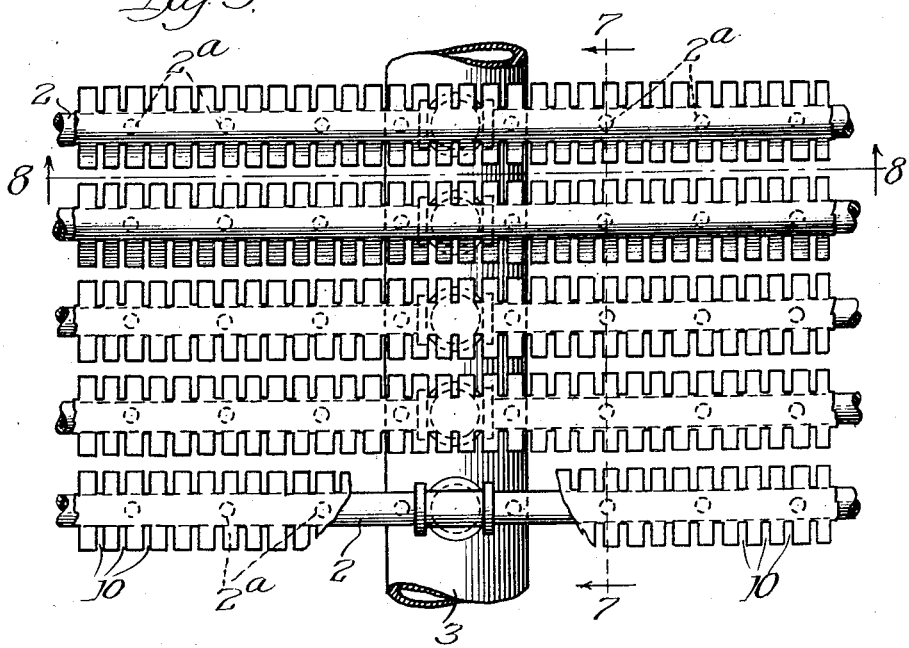

1,544,617

UNITED STATES PATENT OFFICE.

WALTER WAGNER, OF BERWYN, ILLINOIS, ASSIGNOR TO INTERNATIONAL FILTER CO., OF CHICAGO, ILLINOIS, A CORPORATION OF ILLINOIS.

FILTER CONSTRUCTION.

Application filed October 18, 1921. Serial No. 508,518.

*To all whom it may concern:*

Be it known that I, WALTER WAGNER, a citizen of the United States, residing at Berwyn, in the county of Cook and State of Illinois, have invented certain new and useful Improvements in Filter Constructions, of which the following is a specification.

This invention relates generally to liquid-handling apparatus and has particular application to apparatus employed in the filtering or similar treatment of liquids. It resides in an improved construction for apparatus in which a bed or body of fragmentary or granular material, such as gravel, sand or the like, is arranged for the percolation of liquid therethrough, for the purpose of filtration or other treatment.

The general purpose of the invention is the provision of a structure of the sort specified which will increase the efficiency of liquid-handling apparatus by maintaining an equal permeation of liquid through and outflow from a bed of fragmentary permeable material, avoid the formation of flow channels in the bed of material, and maintain the bed in proper position and condition.

Another purpose of the invention is the provision of a structure of the sort specified which is so arranged as to facilitate back-washing of the bed of material for the purpose of cleaning or otherwise treating it, and to contribute to complete and uniform distribution of the back-washing fluid so as to insure proper treatment of all parts of the bed.

A further object of the invention is the provision of such a structure so constructed and arranged as to facilitate removal of the filter bed and other portions in order to permit cleansing or repair of the tank or container and of the conduits, connections and other elements of the installation.

A particular object of the invention is the provision of a structure of the sort described which is designed to prevent any part of a filter bed being rendered inoperative or ineffective by the clogging or stopping of one of a number of associated discharge connections.

A further particular object is the provision of a construction designed particularly to prevent the clogging of the discharge orifices employed in a filter construction below a filter bed.

A still further object is the provision of a construction which will prevent the breaking of pipes or fittings in a filter or the like under weight of superposed material, such as a filter bed and a charge of liquid in the filter.

Another object is the provision of a construction for filters or like apparatus employing a bed of fragmented material, which will permit a material reduction in the amount of foundation or supporting material required in the permeable bed, and thereby permit reduction in the thickness of the bed.

Other and further objects of the invention will be pointed out hereinafter, indicated in the appended claims, or obvious from a further understanding of the present disclosure.

For the purpose of the present application I have shown in the accompanying drawings forming a part of this specification various structural arrangements in which my invention may be embodied, but it is to be understood that the same are presented here for the purpose of illustration, and not with the idea that the invention is limited to these particular embodiments, as I am aware that the essential features characterizing the invention are susceptible of wide variation and modification.

In these drawings, all of the illustrations are diagrammatic,

Fig. 1 being a view in the nature of a fragmentary vertical section of a portion of the bottom of a filter tank installation embodying my invention;

Fig. 2 is a fragmentary top view of the same;

Fig. 3 is a fragmentary vertical section similar to Fig. 1 but of a modified embodiment of the invention;

Fig. 4 is a fragmentary top view of the same;

Fig. 5 is another fragmentary section illustrating a third form;

Fig. 6 is a fragmentary top view of the same;

Fig. 7 is a fragmentary vertical section of a fourth form;

Fig. 8 is another fragmentary vertical section of the form illustrated in Fig. 7 but taken at right angles thereto; and Fig. 9 is a fragmentary top view of the form illustrated in Figs. 7 and 8.

The general nature of the invention will be understood from a detail consideration of these several illustrative embodiments. Referring to the drawings by means of the reference numerals, let it be understood that the numeral 1 designates the bottom portion of a suitable tank or container of a type employed in liquid filtering or treating apparatus such as a so-called filter tank or basin. Associated with the tank are the conduits 2 which I will designate as distributing conduits. As in ordinary construction of water filters or purifiers, there are a number of these distributing conduits disposed in suitable arrangement in locations to serve different portions of the tank, and ordinarily these distributing conduits are connected and served by suitable headers or master pipes 3. In the ordinary operation of a filter these distributing conduits afford means for the discharge or withdrawal of filtered liquid which is passed through the filter bed, while in the operation of backwashing these distributing conduits are utilized to convey clear liquid into the tank below the filter bed and contribute to the forcing of the liquid upwardly therethrough to wash the bed. Accordingly, each distributing conduit is provided with a plurality of orifices $2^a$ affording communication between the interior of the tank and the conduit, which orifices may be equipped, if desired, with directing nozzles or strainers 4. In some instances the distributing conduits may be imbedded in the material of which the tank bottom is formed, or they may be disposed below the upper surface of the tank bottom, while in other instances, as illustrated in Fig. 3, the distributing conduits may be disposed above the tank bottom. The logical and most convenient arrangement of these distributing conduits is in parallel relationship.

In the customary construction of so-called sand filters, which are characterized by the employment of a bed of fragmented material, such as sand, as the filtering medium, it is customary to build up the filter bed with coarse material, such as gravel, at the bottom, and the fine material in strata at the top, the coarse material being intended to function as a supporting foundation for the fine material, and prevent its reaching the orifices of the discharge conduits, and also to prevent the packing of material about the orifices of the discharge conduits. As heretofore constructed, however, the arrangement of the material has contributed to the localization of the effectiveness of the respective orifices. This has been found to be true particularly in the back-washing operation, and it has been demonstrated in instances where the orifice has become clogged. In such contingencies it has been found that in the localized zone of influence of the clogged orifice the material is not subjected to the proper flow of back-washing fluid, and hence is not properly cleaned. Likewise in the filtering operations it has been found that in the event of the clogging of an orifice the local zone of the filter bed served by that orifice has its effectiveness greatly reduced.

Such disadvantages of prior constructions are avoided, and distinctly new advantages of operation obtained by the provision, in the combination constituting my invention, of removable channel-forming supports for maintaining the fragmented material in the proper association with the distribution pipes or their orifices. One fashion in which these filter bed supports may be formed is illustrated in Figs. 1 and 2 where they are shown as grid-like members arranged for association with the distribution conduits and including base portions 5 arranged to find support upon the bottom or floor of the filter tank, and foraminous grid portions 6 affording apertures $6^a$. The arrangement of the base portions 5 affords lateral and longitudinal passage ways, the latter being designated by the numeral 7. The lateral passage ways afford intercommunication between the longitudinal passage ways of juxtaposed grid members, and the openings $6^a$ have communication with the lateral and longitudinal passage ways. In the assembling of these bed supporting members with the filter tank and its distribution conduits, they are placed over the conduits in such relationship that the orifices of the latter will have communication with the passage ways afforded by the supporting members. The construction of the foraminous portions of the members is such that the contemplated fragmented material, represented by the layer of gravel G, will find support thereon, the openings $6^a$ being of such size as to prevent passage of the fragmented material. The effective filter bed of fine fragmented material will be supported upon the lower strata of coarse material, in the customary fashion. In the embodiment illustrated in Figs. 3 and 4 the bed supporting members are in the nature of racks having base portions 8 carrying upwardly and laterally extending fingers or tines 9 arranged in series so as to afford passage ways $9^a$. These may be employed in association with imbedded distribution conduits, or with conduits disposed above the level of the tank bottom, as illustrated. The passages $9^a$ afford communication from the orifices of the distribution conduits, not only upwardly through the superposed filter bed, but also laterally between the longitudinal passage ways which are afforded by juxtaposed supporting members. When associated with elevated distribution pipes presenting downwardly directed orifices, as shown in Fig. 3, these supporting members function in conjunction with the pipes to support the fragmented material G, or, if the tines 9 overhang the pipes, they may support the fragmented material out of contact with the latter.

In Figs. 5 and 6 the bed supports are in the nature of bars which differ from the form in Fig. 1 in the fact that they are disposed intermediate the distribution conduits instead of over them, and they function in association with the conduits to support the fragmented material. As in the forms previously mentioned, these bars afford lateral and longitudinal passage ways having communication with one another and with the orifices of the distribution conduits, as well as upward passage ways.

In the embodiment illustrated in Figs. 7, 8 and 9 the supports S are in the form of shields of substantially inverted U-shaped cross-section, their marginal portions finding support upon the floor of the tank when the shields are placed over the distribution conduits. Their lateral portions are provided with apertures 10 which afford communication upwardly, and also laterally between the areas covered by juxtaposed supports while, when disposed in association with one another, these shields provide support for the fragmented material effective to sustain it out of contact with the distribution conduits.

The actual form and construction of the supports may vary greatly. Those of a form such as illustrated in Figs. 7 to 9 may be formed of sheet metal; those of a form illustrated in Figs. 3 and 4 may be cast; while those of a form illustrated in Figs. 1, 2, 5 and 6 may be made of pottery material or concrete. When of concrete or the like, the members may be reinforced, as by rods R illustrated in Figs. 5 and 6.

Incident to the contemplated use of the installation for filtering, it will be understood that liquid is run into the tank above the filter bed, and passes through the latter, suspended matter being retained on the material of which the bed is constituted. The liquid percolates through the filter bed and finally reaches the orifices 2ᵃ of the distribution conduits, finding outlet therethrough. The normal tendency of the fragmented material incident to this movement of the liquid is to become compacted toward the outlets. The bed supports function to maintain free intercommunication between the areas or zones which normally would be served locally by the respective orifices, and thereby prevent the localizing of the influence of the orifices. They function to equalize the hydrostatic pressure throughout the entire bottom area of the tank, and thereby prevent the formation of flow channels or localization of flow in the filter bed. In their function of holding the fragmented material away from the orifices, they function to prevent stoppage or partial stoppage of the orifices, while in the event of such stoppage, the effectiveness of the area of the bed above the orifice is not impeded or decreased, as the liquid which normally would find discharge through such orifice has access to adjacent orifices both laterally and longitudinally of the supports.

The effectiveness of the arrangement is of particular importance in the operation of back-washing. In this operation it is desirable to thoroughly flush and agitate all portions of the filter bed. When a bed has become highly compacted there is a tendency to establish flow channels in localized portions thereof, through which channels the wash water passes, without breaking up and flushing other portions of the bed. In the employment of my construction the tendency to form flow channels is practically eliminated by the distribution of the influent wash water because of the facility afforded for equalization of pressure over the entire bottom of the tank. In the event of stoppage of any of the orifices, the portion of the bed associated immediately therewith may be adequately served with wash water by virtue of the free communication between different apertures below the level of the filter bed.

Structures including my invention are of particular advantage in installations where the distribution pipes are supported above the floor of the tank. In many instances the distribution pipes have been broken off from their connections by the weight of the filter bed and water imposed upon them. In my improved construction, the major portion or all of the weight of the filter bed and water in and upon the same is carried by the supporting members S, thus relieving the pipes, and permitting more economical construction therein. Moreover, as the supporting members keep the space between the pipes clear of gravel, the construction effects a substantial reduction in the quantity of gravel required in a given filter.

Support members of a given form are adapted to a wide variety of applications, so that they may be installed in apparatus already in use without alteration therein. They permit of access to any part of the tank bottom and do not interfere in any way with the placing or removal of the filter bed.

I claim:

1. In filter construction, including a bed of gravel and a plurality of associated outlet pipes, a plurality of supporting members supported intermediate the pipes for supporting the gravel bed, said supporting members affording vertical flow passages and horizontal flow passages permitting circulation and distribution of water to and from the pipes below the gravel bed.

2. In filter construction, in combination with the filter floor and inlet and discharge pipes having parts disposed above the filter floor, said pipes being provided with flow apertures, supporting members supported on the floor intermediate said pipes and cooperating therewith to maintain the filter bed material supported above the filter floor, said supporting members having flow passages in communication below the filter bed material.

3. In filter construction, in combination with the filter floor and discharge pipes disposed adjacent but spaced above the filter floor, bed supporting members resting upon the filter floor between said pipes, said supporting members affording passages for flow of liquid through them both vertically and horizontally and having gravel retaining portions preventing the passage of the filter bed gravel under the pipes.

4. In filter construction, the combination with the filter floor, of a plurality of pipes arranged in substantially parallel relationship above the floor, bed supporting members disposed intermediate said pipes and extending substantially parallel therewith, said supporting members having parts for retaining filter bed material away from the pipes and said supporting members also affording flow passages permitting lateral and upward distribution of water from the pipes.

In witness whereof I have hereunto subscribed my name.

WALTER WAGNER.